United States Patent [19]

Riediger

[11] 4,240,457
[45] Dec. 23, 1980

[54] VARIABLE FLOW CONTROL VALVE FOR STEERING SYSTEMS OF ARTICULATED VEHICLES

[75] Inventor: Craig W. Riediger, Washington, Ill.

[73] Assignee: Caterpillar Tractor Co., Peoria, Ill.

[21] Appl. No.: 886,970

[22] Filed: Mar. 15, 1978

[51] Int. Cl.³ .......................................... G05D 11/02
[52] U.S. Cl. .................................... 137/101; 91/461; 137/117
[58] Field of Search ................. 137/98, 101, 504, 100, 137/117

[56] References Cited

U.S. PATENT DOCUMENTS

| | | | |
|---|---|---|---|
| 2,305,023 | 12/1942 | Moore | 137/98 |
| 2,905,191 | 9/1959 | Vander Kaay | 137/117 |
| 3,260,325 | 7/1966 | Brown et al. | |
| 3,403,512 | 10/1958 | Malott | |
| 3,448,685 | 6/1969 | Kroth | 91/436 |
| 3,554,213 | 1/1971 | Yoshino | 137/101 |
| 3,728,941 | 4/1973 | Cryder | 91/447 |
| 3,771,424 | 11/1973 | Allen et al. | 91/446 |
| 3,959,968 | 6/1976 | Greiner | 60/384 |
| 3,960,172 | 6/1976 | Blake | 137/504 |
| 3,996,742 | 12/1946 | Goff | 137/101 X |
| 4,027,474 | 6/1977 | Demase | 137/101 X |

FOREIGN PATENT DOCUMENTS

| | | | |
|---|---|---|---|
| 537572 | 3/1922 | France | 137/100 |
| 1413026 | 8/1965 | France | 137/98 |

*Primary Examiner*—Irwin C. Cohen
*Attorney, Agent, or Firm*—Phillips, Moore, Weissenberger, Lempio & Majestic

[57] ABSTRACT

The steering system comprises at least one double-acting fluid cylinder, a directional control valve connected to the cylinder for alternately extending and retracting the cylinder and a hand metering unit for communicating a fluid steering signal to the directional control valve whereby an engine-driven pump is adapted to communicate pressurized fluid to the cylinder for steering purposes. A variable flow control valve is interconnected between the pump and the hand metering unit for communicating a variable fluid flow to the hand metering unit in proportion to the speed of the pump to vary the fluid steering signal whereby an operator can sense the speed of the pump. In the preferred embodiment of this invention, the variable flow control valve comprises a pair of spring-biased, reciprocal members which sense a differential pressure across the valve to control fluid flow through an outlet which is adapted to be connected to the hand metering unit.

8 Claims, 1 Drawing Figure

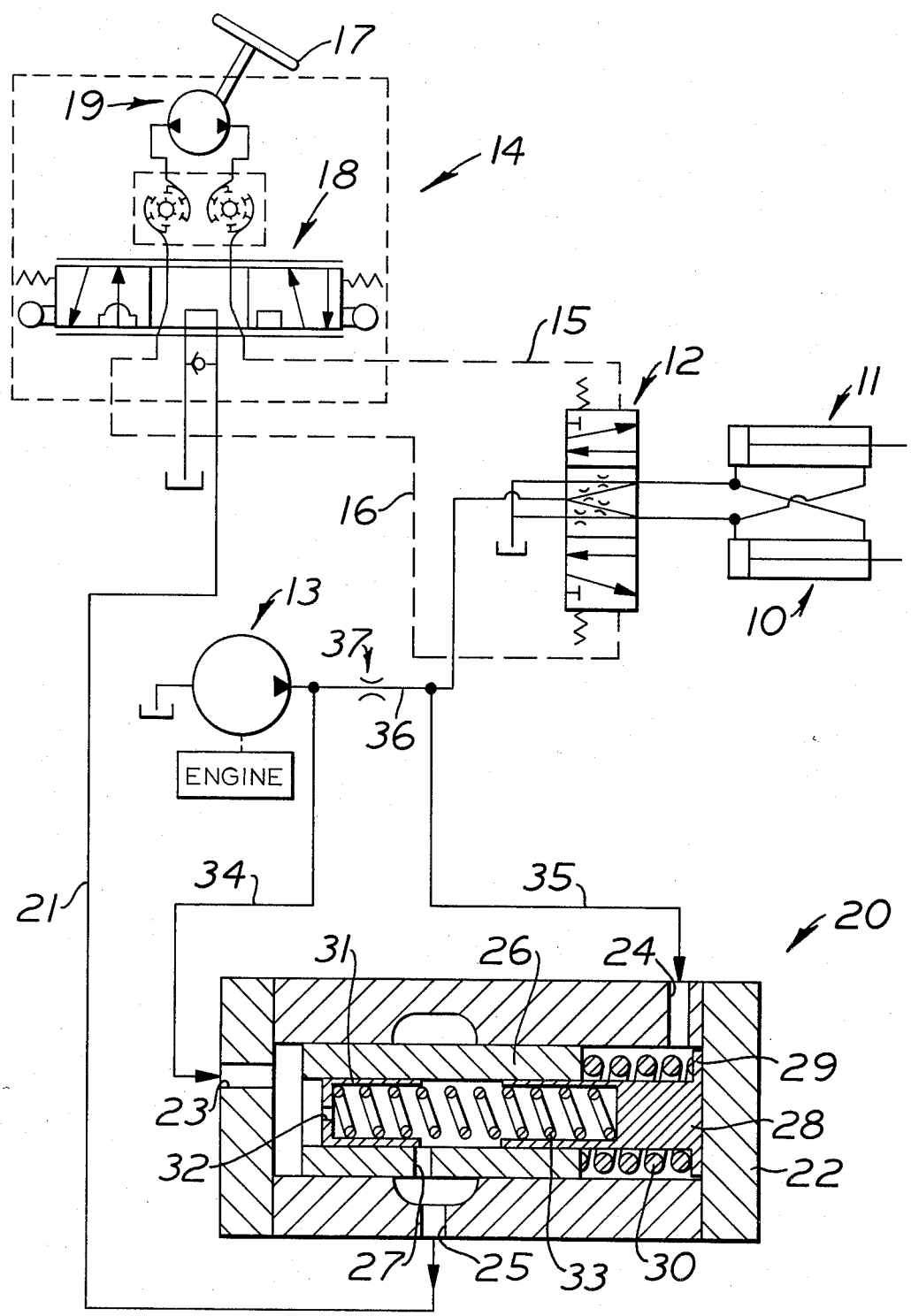

VARIABLE FLOW CONTROL VALVE FOR STEERING SYSTEMS OF ARTICULATED VEHICLES

BACKGROUND OF THE INVENTION

This invention relates to a variable flow control valve which is particularly adapted for use in a steering system of an articulated vehicle.

A steering system for an articulated vehicle comprises at least one double-acting hydraulic cylinder pivotally interconnected between frame members of the vehicle for alternate extension and retraction for steering purposes. An engine-driven pump is adapted to communicate pressurized fluid to the cylinder via a directional control valve, the actuation of which is controlled by a steering wheel. In systems wherein the steering wheel is connected to a hand metering unit to communicate a fluid steering signal to the directional control valve, steering effort is independent of the speed of the engine-driven pump. Therefore, the operator is unable to sense the low speed condition of pump operation, such as when the engine is idling, whereby the operator's ability to steer the vehicle is impeded, i.e., at low pump flow steering speed is reduced.

SUMMARY OF THE INVENTION

The present invention is directed to overcoming one or more of the problems as set forth above.

The variable flow control valve means of this invention finds particular application to the steering system for an articulated vehicle. Such a steering system comprises at least one double-acting fluid cylinder, a directional control valve connected to the cylinder for alternately extending and retracting the cylinder for steering purposes and operator control means for communicating a fluid steering signal to the directional control valve for communicating pressurized fluid from a variable speed pump to the cylinder for selectively actuating the same. The variable flow control valve means of this invention is interconnected between the operator control means and the pump for communicating a variable fluid flow to the operator control means in proportion to the speed of the pump for varying the fluid steering signal to the directional control valve whereby an operator can sense the speed of the pump.

It should be understood herein that the control valve means of this invention will find application in other types of fluid circuits, as will be made obvious to those skilled in the arts relating hereto. The control valve means preferably comprises a housing having first and second inlets and an outlet defined therein. A first member is reciprocally mounted in the housing and has port means formed therethrough for communicating with the outlet and a first biasing means biases the first member towards the first outlet. A second member is reciprocally mounted in the first member and the first and second outlets communicate with first and second ends of the second member, respectively. An orifice means is formed in the second member for creating a differential fluid pressure across the second member and for communicating the first inlet with the port means in response to relative reciprocal movements of the first and second members. A second biasing means biases the second member towards the first inlet whereby fluid pressures in the first and second inlets and the first and second biasing means will cooperate to control the relative reciprocal positions of the first and second members to control the opening and closing of the port means.

BRIEF DESCRIPTION OF THE DRAWING

Other objects of this invention will become apparent from the following description and accompanying drawing which schematically illustrates a steering system for an articulated vehicle employing the variable flow control valve of this invention therein.

DETAILED DESCRIPTION OF THE PREFERRED EMBODIMENT

The drawing illustrates a steering system for an articulated vehicle comprising a pair of double-acting fluid (hydraulic) cylinders 10 and 11 which are connected to a directional control valve 12. The valve, shown in its neutral position, functions in a conventional manner to alternately extend and retract the cylinders for steering purposes when pressurized fluid is communicated thereto from an engine-driven variable speed pump 13. Selective actuation of the directional control valve is controlled by an operator control means or hand metering unit 14 which functions to communicate a fluid (hydraulic) steering signal to the valve via either line 15 or 16.

Hand metering unit may be of the type disclosed in U.S. Pat. No. 3,959,968, for example, wherein a steering wheel 17 is adapted to be rotated to, in turn, actuate a valve 18 and a pump 19 to communicate the fluid steering signal from a hereinafter described line 21 to the directional control valve. In particular, rotation of the steering wheel in one direction will communicate the steering signal to the directional control valve via line 15 to move the valve downwardly whereby cylinder 10 is retracted and cylinder 11 is extended for steering the vehicle in one direction. Conversely, rotation of the steering wheel in the opposite direction will vent line 15 and communicate the steering signal to the directional control valve via line 16 whereby cylinder 10 is extended and cylinder 11 is retracted.

In conventional steering systems of this type, the speed at which steering wheel 17 can be rotated by the operator is the same whether pump 13 is running at a low speed (e.g., low engine idle) or at a relatively higher speed. Therefore, the operator's "feel" is independent of pump speed and thus the operator is made unaware of whether a low or high quantity fluid flow can be communicated to the steering cylinders upon actuation of directional control valve 12.

The present invention overcomes such a problem by providing a variable flow control valve means 20, interconnected between pump 13 and hand metering unit 14, for communicating a variable fluid steering signal to the metering unit via line 21 in proportion to the speed of the pump. The variable fluid steering signal thus communicated to the metering unit will be, in turn, communicated to directional control valve 12 when the operator rotates steering wheel 17 for vehicle steering purposes. Such control of the fluid steering signal will permit the operator to sense the speed of pump 13 by "feel".

Variable flow control valve 20 comprises a multi-part housing 22 having first and second inlets 23 and 24, respectively, and an outlet 25. A first member or sleeve 26 is reciprocally mounted in the housing and has at least one port means 27 formed through a sidewall thereof for communicating the fluid steering signal to outlet 25. The rightward end of the sleeve is reciprocally mounted on a tubular guide member 28, having a flange 29 formed on one end thereof to abut the housing.

A first biasing means or compression coil spring 30 is disposed between sleeve 26 and flange 29 to bias the sleeve towards first inlet 23. A second member or cup-shaped plunger 31 is reciprocally mounted in sleeve 26 and has at least one orifice means 32 formed through an end thereof for creating a differential fluid pressure across the plunger upon communication of first inlet 23 with outlet 25. As more fully explained hereinafter, such communication and the volume flow of fluid to hand metering unit 14 via line 21 will be in direct response to the speed of pump 13.

A second biasing means or compression coil spring 33 is disposed between guide member 28 and plunger 31 to bias the plunger towards first inlet 23. Thus, the fluid pressures in inlets 23 and 24, as well as the biasing forces of springs 30 and 33, will cooperate to control the relative reciprocal positions of sleeve 26 and plunger 31 to control the opening and closing of port 27. It should be noted that pump pressure is communicated to first inlet 23 via a line 34 whereas a reduced pump pressure is communicated to second inlet 24 via a line 35 and a line 36 having a restricted orifice means 37 therein. Thus, a differential fluid pressure will normally occur as between inlet 23 and 24 during vehicle operation.

In operation, and with directional control valve 12 maintained in its illustrated neutral position, engine-driven pump 13 will continuously communicate pressurized fluid to both the head and rod ends of cylinders 10 and 11 via line 36 and the illustrated orifices in the directional control valve to maintain the cylinders in a filled condition to avoid cavitation. Upon rotation of steering wheel 17 to communicate a fluid steering signal through line 15 to move the spool of directional control valve downwardly, pump 13 will communicate pressurized fluid to the rod end of cylinder 10 and to the head end of cylinder 11. The alternate retraction and extension of the cylinder will thus function to steer the vehicle in one direction. Conversely, communication of a fluid steering signal to the directional control valve via line 16 will move the valve spool upwardly to steer the vehicle in the opposite direction.

During steering of the vehicle, fluid flow through orifice 37 will create a substantial pressure drop thereacross to create a lower pressure in inlet 24 than in inlet 23. When the engine is running at a normal and relatively high operating speed, the fluid pressure in line 34 and inlet 23 will cause sleeve 26 to move rightwardly against the combined opposing forces of spring 30 and the relatively lower fluid pressure in line 35 and inlet 24. Simultaneously therewith, the leftward force imposed on plunger 31 by spring 33 will be counteracted by the force imposed on plunger 31, as dictated by the pressure differential occasioned across orifice 32.

The net effect will be one of moving the plunger rightwardly to further compress spring 33 whereby the relative positions of sleeve 26 and the plunger are such so as to maintain port 27 at least substantially open. In this regard, it should be noted that sleeve 26 also moves rightwardly until spring 30 goes "solid" and that rightward movement of plunger 31 is limited due to the force of compressed spring 33. As the right edge of the plunger closes port 27, and the pressure differential across orifice 32 decreases, the rightward force on the plunger decreases. As a result, port 27 is substantially open to communicate a limited maximum fluid steering signal to hand metering unit 14 to permit normal turning of steering wheel 17. It should be noted that since there is a limit on the maximum steering rate, that even though more pump flow is available at high speeds, that port 27 will normally always meter fluid flow therethrough and is, therefore, seldom ever fully open.

Conversely, when the engine is maintained at a low-speed condition of operation, fluid flow to the hand metering unit via line 21 is substantially reduced. Such a reduced fluid flow will alert the operator by "feel" that the engine is now driving pump 13 at a relatively low speed. In particular, fluid flow passing through orifice 27 will be substantially less to, in turn, create a lesser pressure drop across valve 20, i.e., inlets 23 and 24. Sleeve 26 will now move leftwardly under the influence of spring 30 and the force of the fluid pressure in inlet 24. Leftward movement of the sleeve is counteracted by a lowered fluid pressure force at inlet 23.

As the sleeve moves leftwardly, plunger 31 will also move, but at a lesser rate, towards a leftward position to progressively restrict port 27. This movement of the plunger is primarily occasioned by the lessened biasing force of spring 33 as the plunger progressively follows sleeve 26 and by the counteracting force applied by fluid pressure on the inlet side of the plunger. As suggested above, a lowering of fluid flow to the hand metering unit via line 21 will cause the operator to encounter a resistance to the turning of steering wheel 17 whereby he will recognize that he does not have ample fluid flow available to steering cylinders 10 and 11 to obtain a fast or desirable steering rate. As long as the operator recognizes through "feel" that the fluid supply is low, he will handle the vehicle accordingly.

As further suggested above, variable flow control valve 20 has particular application to steering systems for articulated vehicles of the type described above. However, it should be obvious to those skilled in the arts relating hereto that the valve has many other applications wherein it is desirable to control the amount of fluid flow through outlet 25 as a direct function of the differential pressure occurring at inlets 23 and 24.

The embodiments of the invention in which an exclusive property or privilege is claimed are defined as follows:

1. A fluid circuit comprising:
a pump,
a variable flow control valve having a housing defining first and second inlets and an outlet therein, said pump connected to said first and second inlets,
orifice means connected between said pump and said second inlet for creating a differential pressure as between said first and second inlets, and
means in said variable flow control valve for communicating a variable fluid flow from said first inlet through said outlet in response to said differential pressure including a first member reciprocally mounted in said housing and having opposite ends thereof exposed to fluid pressure from said first and second inlets, respectively, said second inlet and the end of the first member exposed thereto being open solely to fluid pressure from said orifice means, a second member reciprocally mounted in said first member and having one end thereof exposed to fluid pressure from said first inlet, port means formed through said first member communicating with said outlet for communicating fluid from said first inlet thereto, and orifice means formed in said second member for creating a differential fluid pressure thereacross and communicating said first inlet with said port means.

2. The fluid circuit of claim 1 wherein said first member comprises a tubular sleeve and said second member comprises a cup-shaped plunger.

3. The fluid circuit of claim 1 further comprising first biasing means for biasing said first member towards said first inlet and second biasing means for biasing said second member towards said first inlet whereby fluid pressures in said first and second inlets and said first and second biasing means will cooperate to control the relative reciprocal positions of said first and second members.

4. The fluid circuit of claim 3 wherein each of said first and second biasing means each comprise a compression coil spring.

5. The fluid circuit of claim 4 further comprising a tubular guide member mounted in said housing, said first biasing means mounted on said guide member and disposed between said guide member and said first member and wherein said second biasing means is disposed between said guide member and said second member.

6. A control valve comprising
a housing having first and second inlets and an outlet defined therein,
a first member reciprocally mounted in said housing, said first and second inlets communicating with first and second ends of said first member, respectively,
port means formed through said first member for communicating with said outlet,
first biasing means for biasing said first member towards said first inlet,
a second member reciprocally mounted in said first member,
orifice means formed in said second member for creating a differential fluid pressure across said second member and for communicating said first inlet with said port means in response to relative reciprocal movements of said first and second members,
second biasing means for biasing said second member towards said first inlet whereby fluid pressures in said first and second inlets and said first and second biasing means will cooperate to control the relative reciprocal positions of said first and second members to control the opening and closing of said port means, and
a tubular guide member mounted in said housing, said first biasing means mounted on said guide member and disposed between said guide member and said first member and wherein said second biasing means is disposed between said guide member and said second member.

7. The valve of claim 6 wherein said first member comprises a tubular sleeve and said second member comprises a cup-shaped plunger.

8. The valve of claim 6 wherein each of said first and second biasing means each comprise a compression coil spring.

* * * * *